United States Patent
Furuki

(10) Patent No.: US 9,350,285 B2
(45) Date of Patent: May 24, 2016

(54) VIBRATION GENERATING DEVICE

(71) Applicant: ALPS ELECTRIC CO., LTD., Tokyo (JP)

(72) Inventor: Shigeru Furuki, Miyagi-ken (JP)

(73) Assignee: ALPS ELECTRIC CO., LTD., Tokyo (JP)

( * ) Notice: Subject to any disclaimer, the term of this patent is extended or adjusted under 35 U.S.C. 154(b) by 6 days.

(21) Appl. No.: 14/473,178

(22) Filed: Aug. 29, 2014

(65) Prior Publication Data
US 2015/0061548 A1 Mar. 5, 2015

(30) Foreign Application Priority Data
Aug. 30, 2013 (JP) .................. 2013-179049

(51) Int. Cl.
*H02P 1/00* (2006.01)
*H02K 33/00* (2006.01)
*H02P 25/02* (2016.01)

(52) U.S. Cl.
CPC .................... *H02P 25/027* (2013.01)

(58) Field of Classification Search
CPC ..... H02K 7/063; H02K 7/061; H02K 21/125; H02K 21/24; H02K 2201/12; H02K 21/14; H02K 2211/03; H02K 23/04; H02K 23/54; H02K 23/56; H02K 29/12; H02K 33/16; H02K 5/00; H02K 5/1672; H02K 5/225
USPC .................... 318/114, 119, 127, 130; 310/81; 463/36, 37; 15/21.1
See application file for complete search history.

(56) References Cited

U.S. PATENT DOCUMENTS

| | | | | |
|---|---|---|---|---|
| 4,261,046 A | * | 4/1981 | Ono .................... | G04C 17/0066 368/28 |
| 4,287,457 A | * | 9/1981 | Takemura .............. | H02K 33/16 310/36 |
| 4,465,959 A | * | 8/1984 | Yajima ..................... | H02P 8/32 318/685 |
| 4,553,075 A | * | 11/1985 | Brown ................ | F04D 25/0606 310/63 |
| 5,023,504 A | * | 6/1991 | Mooney ................ | B06B 1/0644 310/268 |
| 5,126,641 A | * | 6/1992 | Putman ................... | F16F 15/03 318/127 |
| 5,373,207 A | * | 12/1994 | Yamaguchi ............ | H02K 7/063 310/40 MM |

(Continued)

FOREIGN PATENT DOCUMENTS

JP 2003-159565 A 6/2003

*Primary Examiner* — Paul Ip
(74) *Attorney, Agent, or Firm* — Brinks Gilson & Lione

(57) ABSTRACT

A vibration generating device includes a motor having a rotation shaft, a rotating body attached to the rotation shaft, a rotation control unit configured to control rotation of the motor, and magnetic generating unit which is disposed at a non-contact position with the rotating body. The rotating body has the center of gravity positioned on an axis of the rotation shaft, is formed of a magnetic material, and generates vibration by a magnetic attraction force applied to the magnetic material by a magnetic field from the magnetic generating unit when the rotating body is rotated.

10 Claims, 11 Drawing Sheets

(56) References Cited

U.S. PATENT DOCUMENTS

| | | | | |
|---|---|---|---|---|
| 5,717,141 A * | 2/1998 | Kikuchi | G01H 1/10 | 73/579 |
| 6,422,943 B2 * | 7/2002 | Shinohara | A63F 13/06 | 463/37 |
| 6,465,916 B1 * | 10/2002 | Aoshima | G08B 6/00 | 310/156.02 |
| 6,495,939 B1 * | 12/2002 | Yamaguchi | H02K 5/00 | 310/81 |
| 6,565,439 B2 * | 5/2003 | Shinohara | A63F 13/06 | 463/36 |
| 6,573,627 B2 * | 6/2003 | Sun | H02K 21/24 | 310/268 |
| 7,309,365 B2 * | 12/2007 | Yuasa | A47L 9/20 | 15/21.1 |
| 7,919,945 B2 * | 4/2011 | Houston | A63F 13/06 | 310/14 |
| 8,030,807 B2 * | 10/2011 | Gieras | F03G 7/08 | 290/1 R |
| 8,159,102 B2 * | 4/2012 | Yoshikawa | H02K 11/0031 | 310/156.05 |
| 8,227,946 B2 * | 7/2012 | Kim | H02K 5/1677 | 310/71 |
| 2001/0003101 A1 * | 6/2001 | Shinohara | A63F 13/06 | 463/46 |
| 2002/0047334 A1 * | 4/2002 | Aoshima | G08B 6/00 | 310/49.02 |
| 2002/0047388 A1 * | 4/2002 | Ibata | H02K 5/161 | 310/90 |
| 2002/0082090 A1 * | 6/2002 | Shinohara | A63F 13/06 | 463/43 |
| 2002/0195890 A1 * | 12/2002 | Sun | H02K 21/24 | 310/81 |
| 2003/0015929 A1 * | 1/2003 | Lee | H02K 5/24 | 310/81 |
| 2003/0216180 A1 * | 11/2003 | Shinohara | A63F 13/06 | 463/37 |
| 2004/0048664 A1 * | 3/2004 | Shinohara | A63F 13/06 | 463/37 |
| 2004/0067793 A1 * | 4/2004 | Shinohara | A63F 13/06 | 463/37 |
| 2004/0078921 A1 * | 4/2004 | Yuasa | A47L 9/20 | 15/319 |
| 2004/0202313 A1 * | 10/2004 | Matsuura | H02K 7/063 | 379/433.01 |
| 2005/0140223 A1 * | 6/2005 | Yoshida | H02K 7/063 | 310/81 |
| 2006/0049705 A1 * | 3/2006 | Matsubara | H02K 7/063 | 310/81 |
| 2006/0267427 A1 * | 11/2006 | Matsubara | H02K 7/063 | 310/81 |
| 2007/0024134 A1 * | 2/2007 | Huang | H02K 7/063 | 310/81 |
| 2007/0040521 A1 * | 2/2007 | Yamada | B60G 17/0162 | 318/275 |
| 2007/0075673 A1 * | 4/2007 | Nakazawa | H02K 21/14 | 318/712 |
| 2008/0211435 A1 * | 9/2008 | Imagawa | B06B 1/045 | 318/130 |
| 2009/0079200 A1 * | 3/2009 | Gieras | H02K 35/06 | 290/1 R |
| 2010/0314965 A1 * | 12/2010 | Yoshikawa | H02K 11/0031 | 310/216.111 |
| 2011/0181405 A1 * | 7/2011 | Periquet | F16F 9/535 | 340/407.2 |
| 2011/0190058 A1 * | 8/2011 | Houston | A63F 13/06 | 463/36 |
| 2011/0298320 A1 * | 12/2011 | Kim | H02K 5/1677 | 310/71 |
| 2012/0112566 A1 * | 5/2012 | Doll | B26B 19/28 | 310/37 |

* cited by examiner

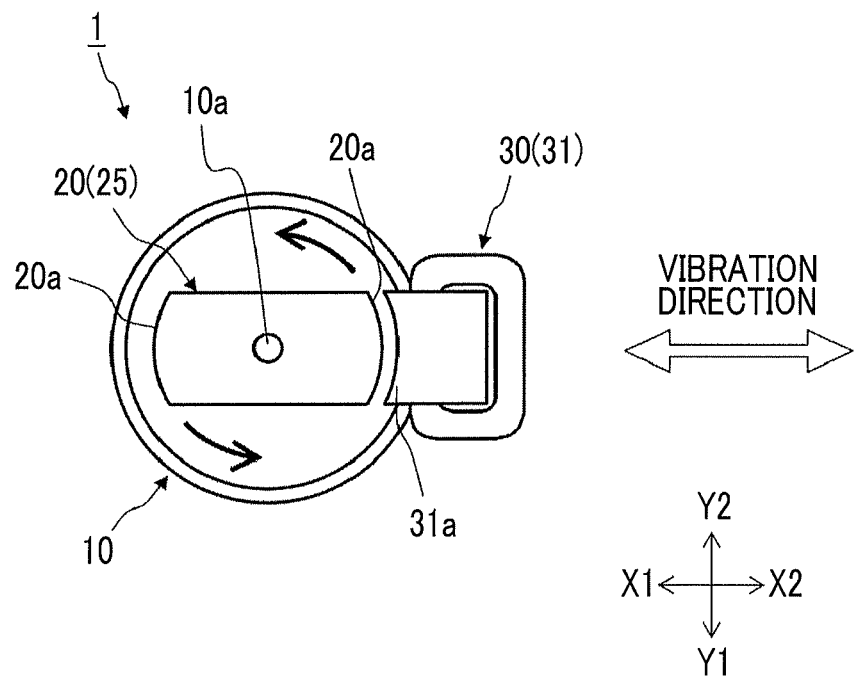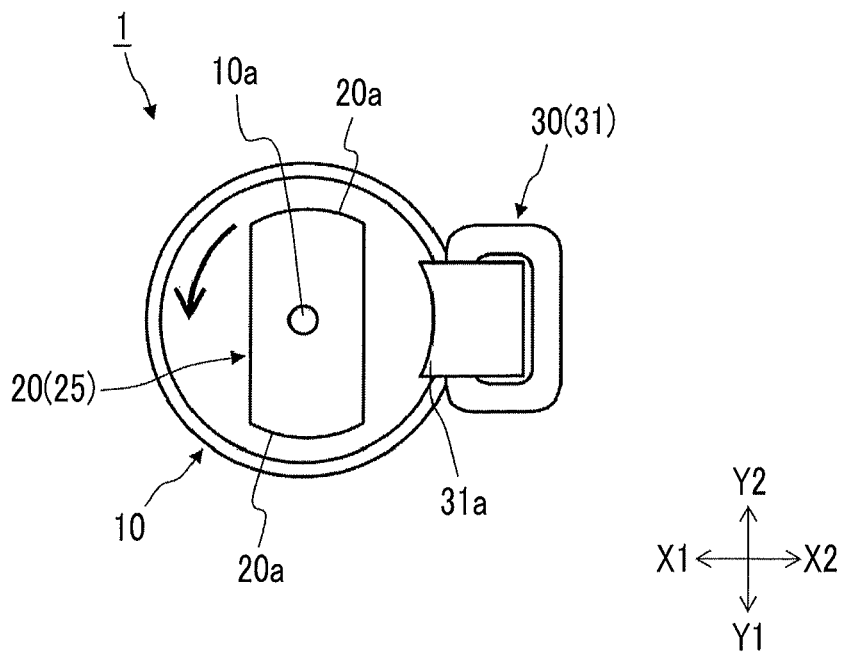

VIBRATION GENERATING DEVICE

CLAIM OF PRIORITY

This application claims the benefit of priority to Japanese Patent Application No. 2013-179049 filed on Aug. 30, 2013, which is hereby incorporated by reference in its entirety.

BACKGROUND

1. Field of the Disclosure

The present disclosure relates to a vibration generating device, and particularly, a vibration generating device mounted on small-sized electronic equipment.

2. Description of the Related Art

In the related art, in electronic equipment such as a controller of a game machine or a cellular phone having a game function, multi-functionality is employed in order to increase realistic sensations to a user playing a game and to enhance usability during the operation. As an example, a vibration generating device is mounted inside electronic equipment, the electronic equipment is vibrated, and thus, tactile stimulus is applied to the person operating the electronic equipment.

In the vibration generating device, vibrations are generated by rotating an eccentric weight attached to a rotation shaft of a motor, and thus, patterns of the vibrations are changed by only changing a rotating speed. Accordingly, research has been conducted to generate various kinds of vibrations. For example, in Japanese Unexamined Patent Application Publication No. 2003-159565, two eccentric weights are attached, and thus, a large vibration and a small vibration can be generated.

FIGS. 11A and 11B are side views showing a vibration generating device of the related art, FIG. 11A is a side view at the time of a normal rotation, and FIG. 11B is a side view at the time of a reverse rotation.

As shown in FIGS. 11A and 11B, a vibration generating device 100 of the related art includes a motor 101, a rotation shaft 102 of the motor 101, a first weight 103, a second weight 104, and a clutch 105. The entire clutch 105 is inserted into the rotation shaft 102, and the clutch is disposed between the first weight 103 and the second weight 104 and transmits or disconnects the rotation of the rotation shaft 102. As shown in FIG. 11A, when the rotation of the rotation shaft 102 is a normal rotation, the first weight 103 and the second weight 104 are rotated normally, and thus, a large vibration is obtained. However, as shown in FIG. 11B, when the rotation of the rotation shaft 102 is in the reverse rotation state, the second weight 104 is not rotated, only the first weight 103 is rotated, and thus, a small vibration is obtained.

However, even when two eccentric weights are attached and the patterns of the vibrations are controlled, the changeable parameters are obtained only by rotating whichever weight or by changing the rotating speed, and thus, the patterns of the vibrations are limited.

SUMMARY

A vibration generating device includes: a motor having a rotation shaft; a rotating body which is attached to the rotation shaft, is rotated along with rotation of the rotation shaft, and generates a vibration; a rotation control unit configured to rotation of the motor; and magnetic generating means which is to be disposed at a non-contact position with the rotating body, in which the rotating body has the center of gravity positioned on an axis of the rotation shaft, has at least a magnetic material, and generates the vibration by a magnetic attraction force applied to the magnetic material by a magnetic field from the magnetic generating means when the rotating body is rotated.

BRIEF DESCRIPTION OF THE DRAWINGS

FIG. 2A is a plan view thereof, and FIG. 2B is a front view thereof;

FIGS. 5A and 5B are schematic views showing an operation of the vibration generating device of the first embodiment, FIG. 5A shows a state where a magnetic attraction force is increased, and FIG. 5B shows a state where the magnetic attraction force is decreased;

FIG. 7A shows a state where the device is vibrated in a first vibration direction, and FIG. 7B shows a state where the device is vibrated in a second vibration direction;

FIG. 9A is a plan view thereof, and FIG. 9B is a front view thereof;

FIG. 10A shows a state where a magnetic attraction force is decreased, and FIG. 10B shows a state where the device is vibrated in a second vibration direction; FIG. 11A is a side view at the time of a normal rotation, and FIG. 11B is a side view at the time of a reverse rotation.

DESCRIPTION OF THE EXEMPLARY EMBODIMENTS

Hereinafter, embodiments of the present invention will be described in detail with reference to the drawings. Moreover, for easy understanding, dimensions of the drawings are appropriately changed.

Figure 1:
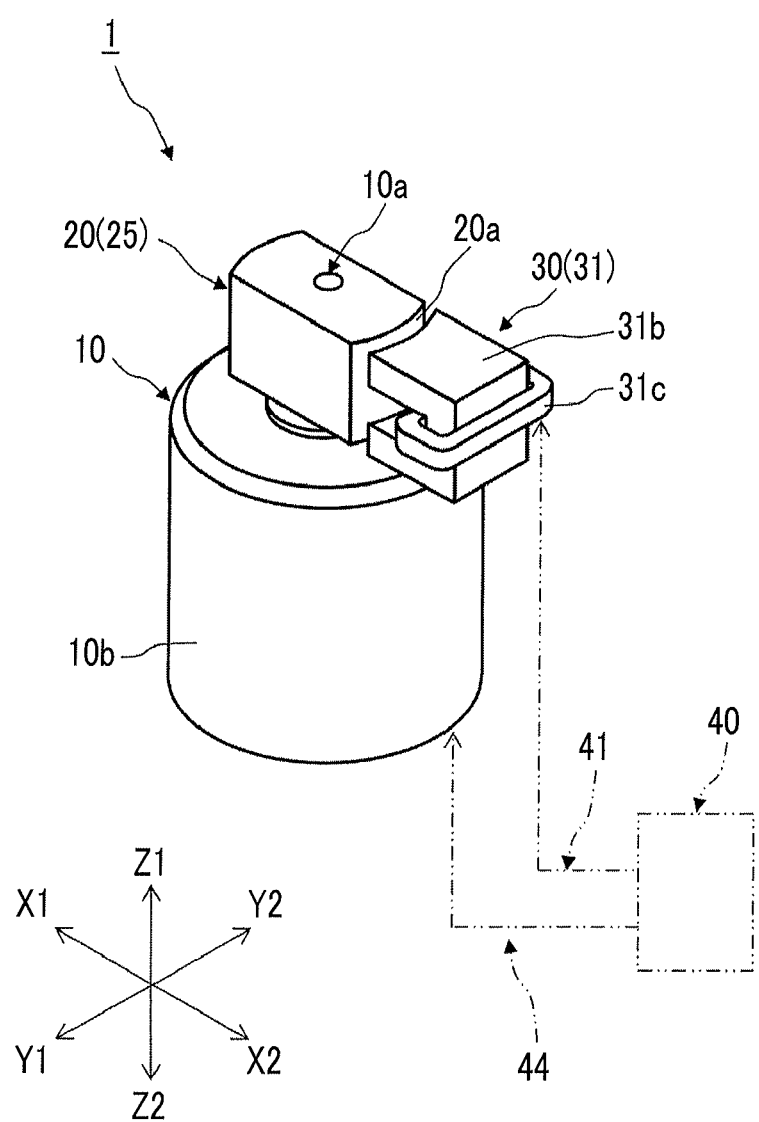
FIG. 1 is a perspective view showing a vibration generating device of a first embodiment of the present invention.
Figure 2A:
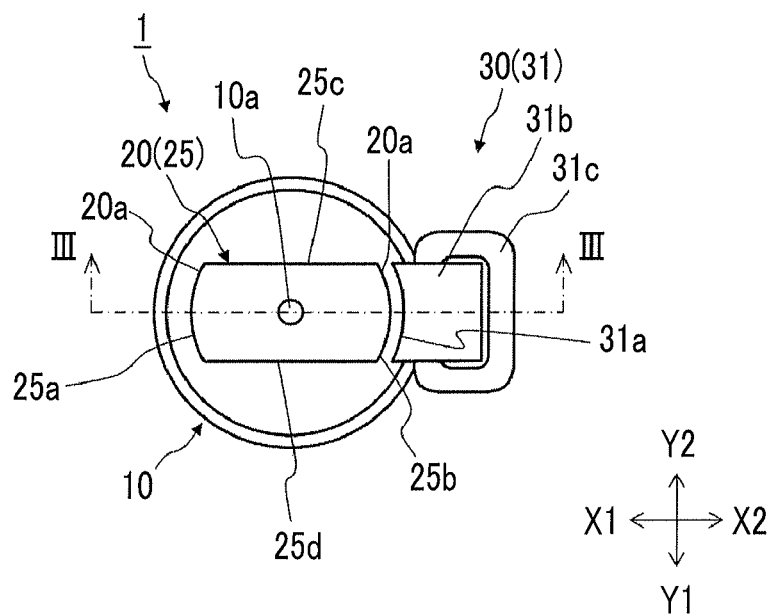
FIGS. 2A and 2B are outline views showing the vibration generating device of the first embodiment.
Figure 2B:
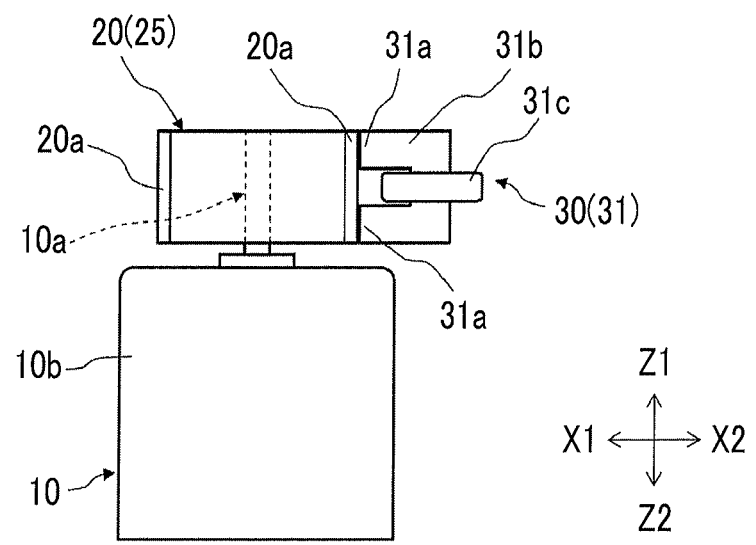
Figure 3:
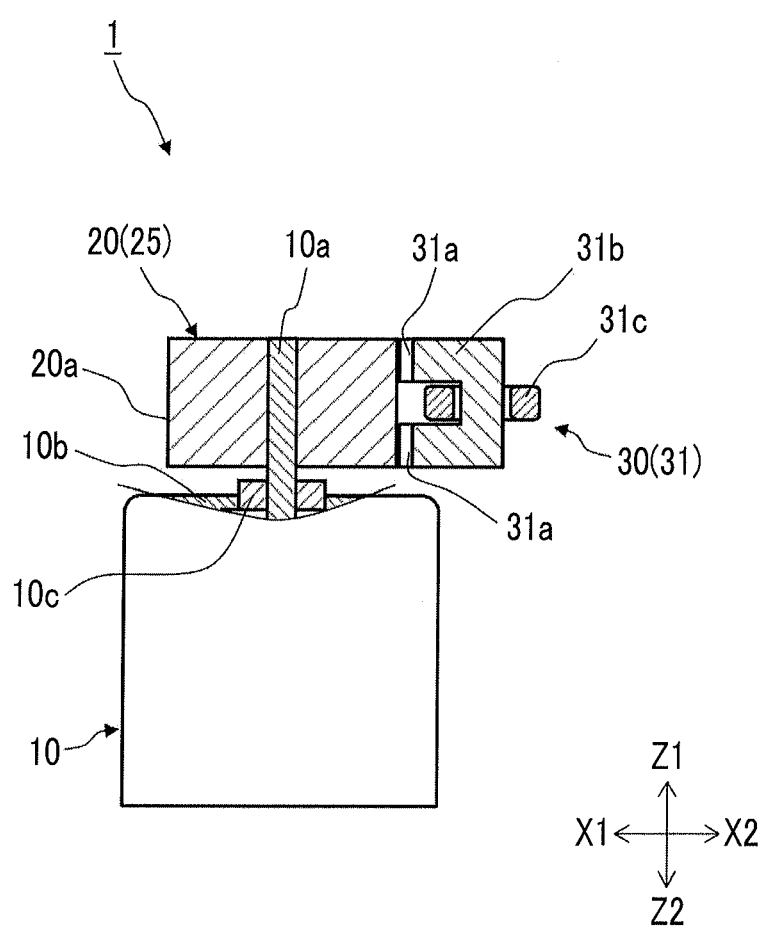
FIG. 3 is a partial cross-sectional view taken along line of FIG. 2A.
Figure 4:
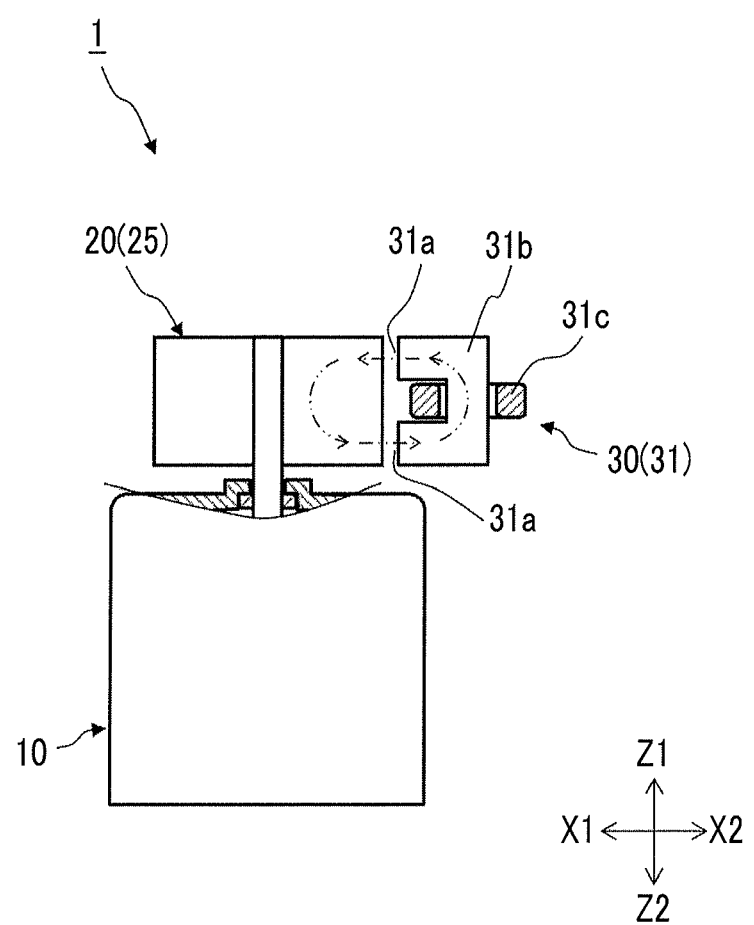
FIG. 4 is a schematic view showing a magnetic field generated in the vibration generating device of the first embodiment.

A vibration generating device 1 of a first embodiment of the present invention will be described. FIG. 1 is a perspective view showing the vibration generating device 1 of the first embodiment. FIGS. 2A and 2B are outline views showing the vibration generating device 1 of the first embodiment, FIG. 2A is a plan view thereof, and FIG. 2B is a front view thereof. FIG. 3 is a partial cross-sectional view taken along line of FIG. 2A. FIG. 4 is a schematic view showing a magnetic field generated in the vibration generating device 1 of the first embodiment. FIGS. 5A and 5B are schematic views showing an operation of the vibration generating device 1 of the first embodiment, FIG. 5A shows a state where a magnetic attraction force is increased, and FIG. 5B shows a state where the magnetic attraction force is decreased.

As shown in FIGS. 1 to 3, the vibration generating device 1 of the first embodiment includes a motor 10 having a rotation shaft 10a, a rotating body 20 attached to the rotation shaft 10a, a rotation control unit 40 controlling the rotation of the motor 10, and a magnetic generating means 30 disposed at a non-contact position with the rotating body 20.

In the vibration generating device 1 of the present embodiment, the rotating body 20 is a weight 25 having the center of gravity positioned on the axis of the rotation shaft 10a and having a shape in which a portion of a side surface of a column including a convex surface 20a having a curvature about the rotation shaft 10a is cut. As shown in FIGS. 2A and 2B, the weight 25 is formed of a soft magnetic material, has a uniform shape along an axial direction of the rotation shaft 10a, and has an approximately rectangular shape which is formed of arcs 25a and 25b in the projected shapes when viewed in the axial direction of the rotation shaft 10a and straight lines 25c and 25d which connect both ends of the arcs 25a and 25b. The projected shapes of the convex surface 20a are two arcs 25a and 25b, and are positioned at point symmetry positions about the rotation shaft 10a. In addition, two straight lines 25c and 25d are also positioned at point symmetry positions, and the center of gravity of the weight 25 is positioned on the axis of the rotation shaft 10a. In addition, the weight 25 is formed by partially cutting the side surfaces of the column, and thus, the weight can be simply formed.

In the vibration generating device 1 of the present embodiment, the magnetic generating means 30 is an electromagnet 31 having a magnetic operation unit 31a formed in a concave arc shape having curvature about the rotation shaft 10a, and is disposed in a direction (X2 direction) orthogonal to the rotation shaft 10a at a gap with the rotating body 20. In the electromagnet 31, coils 31c are wound around a U-shaped core 31b, and energization of the electromagnet is controlled by the rotation control unit 40 which is electrically connected to the coils 31c by a wiring 41.

As shown in FIG. 3, the motor 10 includes a stator and a rotor (both are not shown) disposed inside the casing 10b, and can rotate the rotation shaft 10a supported by the bearing portion 10c. In addition, in the present embodiment, generally, a small size motor is used as the motor 10, and the details thereof are omitted. The motor 10 is controlled by the rotation control unit 40 electrically connected by the wiring 44.

The rotation control unit 40 is an electronic circuit, which controls the rotation of the motor 10. The rotation control unit 40 of the present embodiment controls starting, stopping, and the rotating speed of the motor 10, and controls starting, stopping and the amount of current energized by the coils 31c of the electromagnet 31 which is the magnetic generating means 30. In addition, the rotation control unit 40 can be positioned at a position separated from the motor 10 or the magnetic generating means 30 via wirings 41 and 44. An electronic circuit of the electronic equipment attaching the vibration generating device 1 may configure the rotation control unit 40.

In the vibration generating device 1 of the present embodiment, since the center of gravity of the rotating body 20 is positioned on the axis of the rotation shaft 10a, in a case where the electromagnet 31, which is the magnetic generating means 30, stops, even when the motor 10 starts, vibration is not generated at all. Accordingly, when power saving is not particularly required, the motor 10 starts in accordance with the starting of the electronic equipment, and thus, the rotating body 20 may be rotated.

When generation of the vibration is required, the coils 31c of the electromagnet 31 is energized, and thus, the magnetic generating means 30 starts. The electromagnet 31, which is the magnetic generating means 30, includes a magnetic operation unit 31a which has curvature about the rotation shaft 10a at the end of the core 31b and is formed in a concave arc shape. The rotating body 20 is the weight 25 having a shape in which the side surface of the column having the convex surface 20a is partially cut. As shown in FIG. 4, the magnetic field generated in the electromagnet 31 which is the magnetic generating means 30 can be a closed circuit, which is returned through the weight 25, formed of a soft magnetic material. Accordingly, a magnetic attraction force is generated.

The state in which the motor 10 starts and the weight 25 is rotated includes a state in which the side surface of the weight 25 and the magnetic operation unit 31a of the magnetic generating means 30 approaches each other as shown in FIG. 5A, and a state in which the side surface of the weight 25 and the magnetic operation unit 31a of the magnetic generating means 30 separates each other as shown in FIG. 5B. As understood from FIGS. 5A and 5B, the side surface of the rotating body 20 and the magnetic operation unit 31a of the magnetic generating means 30 approaches each other by a half-rotation period. The rotating body 20 and the magnetic operation unit 31a approaches each other, and thus, the magnetic attraction force can be effectively applied. When the generation of the vibration is required, by the magnetic field from the magnetic generating means 30, the magnetic attraction force is generated in the rotating body 20 formed of the soft magnetic material. If the coils 31c of the electromagnet 31 are energized, the magnitude of the magnetic attraction force applied to the rotating weight 25 is periodically changed, and thus, the vibration in an X1 -X2 direction can be generated in the vibration generating device 1.

The magnetic generating means 30 applies the magnetic attraction force from the direction (X2 direction) orthogonal to the rotation shaft 10a, and thus, the vibration in the direction (X1-X2 direction) orthogonal to the rotation shaft 10a can be effectively generated. The vibrations generated at this time are vibrations in which the vibration generated in the motor 10 and the vibration generated in the magnetic generating means 30 are mixed, and thus, when the motor and the magnetic generating means are fixed to a case, the vibrations become minute vibrations in which each fixed location is a fixed end.

The amplitude of the vibration can be adjusted by controlling the current energized with respect to coils 31c of the electromagnet 31, and can be adjusted even when the motor 10 and the magnetic generating means 30 are fixed state. A basic frequency of the vibration can be adjusted by the rotating speed of the rotating body 20.

Hereinafter, effects according to the present embodiment will be described.

The vibration generating device 1 of the present embodiment includes the motor 10 having the rotation shaft 10a, the rotating body 20 which is rotated along with the rotation of the rotation shaft 10a and generates the vibration, the rotation control unit 40 which controls the rotation of the motor 10, and the magnetic generating means 30 which is disposed at a non-contact position with the rotating body 20. Moreover, the center of gravity of the rotating body 20 is positioned on the axis of the rotation shaft 10a, and the rotating body is formed of the soft magnetic material and has the outer shape which can generate the vibration by the magnetic attraction force which is applied to the soft magnetic material by the magnetic field from the magnetic generating means 30 when the rotating body is rotated.

According to this aspect, by the magnetic field generated by the magnetic generating means 30, the magnetic attraction force from the magnetic generating means 30 disposed at the non-contact position attracts the soft magnetic material, and thus, the vibration generating device 1 generating the vibration when the rotating body 20 formed of the soft magnetic material is rotated can be obtained. By controlling the strength of the magnetic field from the magnetic generating means 30 and the rotating speed of the motor 10, various vibration patterns can be easily obtained.

In addition, in the vibration generating device 1 of the present embodiment, the rotating body 20 is the weight 25 having the center of gravity positioned on the axis of the rotation shaft 10a and having an approximately rectangular shape which is formed of two arcs 25a and 25b in which the projected shapes are point symmetrically when viewed in the axial direction of the rotation shaft 10a, and two straight lines 25c and 25d which connect ends of the arcs 25a and 25b. According to this aspect, the rotating body 20 generating the vibration is the weight 25 having the shape in which the side surface of the column is partially cut, and thus, the rotating body can be simply formed.

Moreover, in the vibration generating device 1 of the present embodiment, the magnetic generating means 30 is disposed in the direction orthogonal to the rotation shaft 10a at a gap with the rotating body 20. According to this aspect, the magnetic generating means 30 applies the magnetic attraction force from the direction orthogonal to the rotation shaft 10a, and thus, the vibration in the direction orthogonal to the rotation shaft 10a can be effectively generated.

In the vibration generating device 1 of the present embodiment, the magnetic generating means 30 includes the magnetic operation unit 31a formed in the concave arc shape having the curvature about the rotation shaft 10a, the rotating body 20 includes the convex surface 20a having the curvature about the rotation shaft 10a, and thus, when the rotating body 20 is rotated, the convex surface 20a approaches the magnetic operation unit 31a. According to this aspect, the rotating body 20 and the magnetic operation unit 31a of the magnetic generating means 30 approaches each other, and thus, the magnetic attraction force can be effectively applied.

In the vibration generating device 1 of the present embodiment, the magnetic generating means 30 is the electromagnet 31, and the magnetic attraction force can be changed by controlling the current energized with respect to the coils 31c of the electromagnet 31. According to this aspect, the strength of the magnetic field can be changed by controlling the current energized with respect to the coils 31c of the electromagnet 31, and thus, according to this, an attraction force of the rotating body 20 can be freely controlled, and various vibration patterns can be obtained.

In the vibration generating device 1 of the present embodiment, preferably, the coils 31c of the electromagnet 31 are energized when the vibration is generated, and the rotation control unit 40 controls the rotation of the motor 10 to rotate the rotating body 20 prior to the vibration.

In the vibration generating device of the related art, the vibration is always generated when the eccentric weight is rotated, and thus, the rotation itself should stop when the vibration is not required. Accordingly, the motor 10 is initially rotated when the vibration is required, and thus, a timing at which the vibration is generated is delayed. On the other hand, according to the configuration, the center of gravity of the rotating body 20 is positioned on the rotation shaft 10a, and thus, the vibration is not generated even when the rotating body is rotated in the state where the magnetic field is not applied, and the rotating body can always rotate. Accordingly, it is possible to instantaneously generate the vibration.

Figure 6:
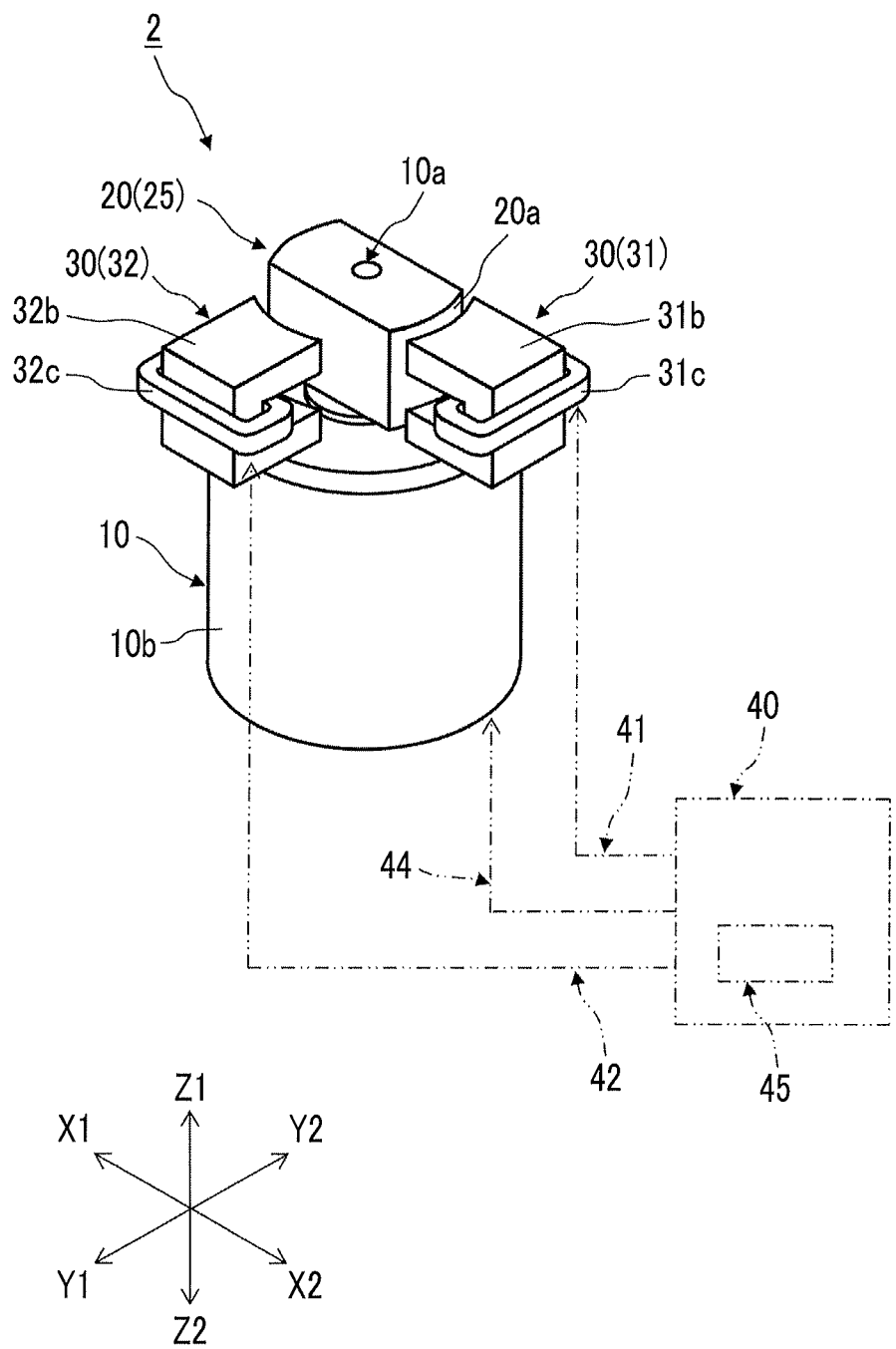
FIG. 6 is a perspective view showing a vibration generating device of a second embodiment of the present invention.
Figure 7A:
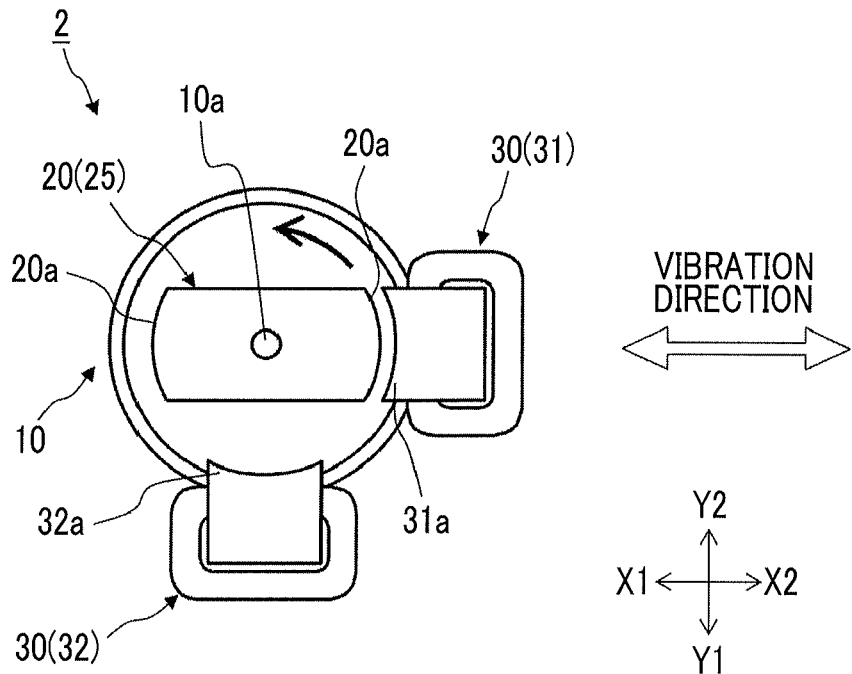
FIGS. 7A and 7B are schematic views showing an operation of the vibration generating device of the second embodiment.
Figure 7B:
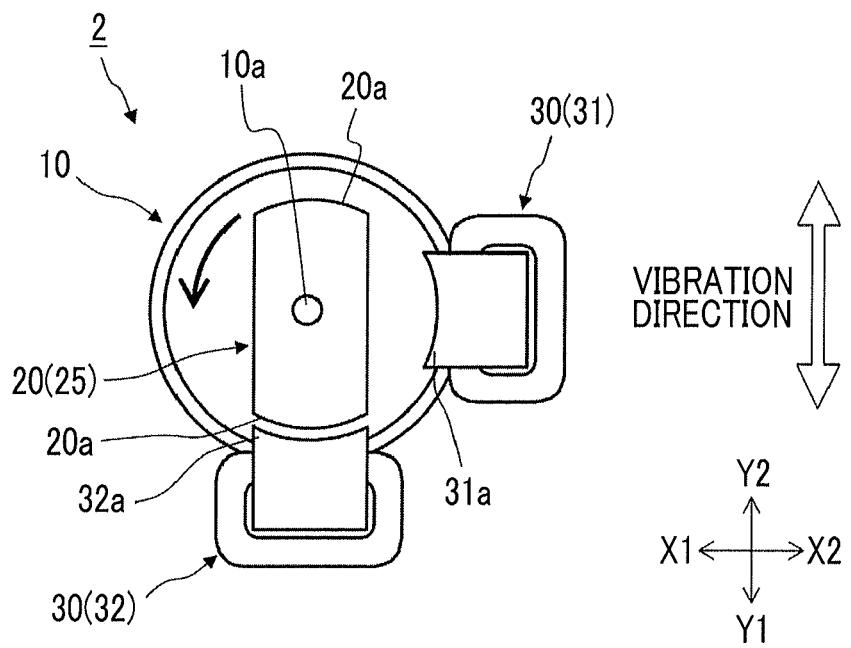

A vibration generating device 2 of a second embodiment of the present invention will be described. FIG. 6 is a perspective view showing the vibration generating device 2 of the second embodiment. FIGS. 7A and 7B are schematic views showing operation of the vibration generating device 2 of the second embodiment, FIG. 7A shows a state where the device is vibrated in a first vibration direction, and FIG. 7B shows a state where the device is vibrated in a second vibration direction.

As shown in FIGS. 6 to 7B, the vibration generating device 2 of the second embodiment includes the motor 10 having the rotation shaft 10a, the rotating body 20 attached to the rotation shaft 10a, the rotation control unit 40 which controls the rotation of the motor 10, and the magnetic generating means 30 which is disposed at a non-contact position with the rotating body 20. As a difference of the second embodiment with respect to the vibration generating device 1 of the first embodiment, in the second embodiment, the magnetic generating means 30 is also disposed in the Y1 direction. Moreover, other configurations are the same as the vibration generating device 1 of the first embodiment, and the same reference numerals are assigned to the same portions, and the descriptions thereof are omitted.

The magnetic generating means 30 disposed in the Y1 direction is an electromagnet 32 having a magnetic operation unit 32a formed in a concave arc shape having curvature about the rotation shaft 10a, and is orthogonal to the rotation shaft 10a at a gap with the rotating body 20. In the electromagnet 32, coils 32c are wound around a U-shaped core 32b, and energization of the electromagnet is controlled by the rotation control unit 40, which is electrically connected to the coils 32c by a wiring 42.

In the vibration generating device 2 of the present embodiment, the rotating body 20 is the weight 25 having the center of gravity disposed on the axis of the rotation shaft 10a and having the shape in which the portion of the side surface of the column including a convex surface 20a having the curvature about the rotation shaft 10a is cut. The weight 25 is formed of the soft magnetic material and is formed by partially cutting the side surfaces of the column, and thus, the weight can be simply formed.

The rotation control unit 40 is an electric circuit, which controls the rotation of the motor 10. The rotation control unit 40 of the present embodiment controls the starting, the stopping, and the rotating speed of the motor 10, and controls starting, stopping, and the amount of the current energized to the coils 31c and the coils 32c of the electromagnet 31 and the electromagnet 32 which are the magnetic generating means 30. Moreover, the rotation control unit 40 includes vibration direction changing means 45, which switches starting and stopping of the energization currents of the electromagnet 31 and the electromagnet 32. Moreover, the rotation control unit 40 can be positioned at a position separated from the motor 10 or the magnetic generating means 30 via wirings 41, 42, and 44. In addition, an electronic circuit of the electronic equipment attaching the vibration generating device 2 may configure the rotation control unit 40.

When the generation of the vibration is required, both or any one of the coils 31c of the electromagnet 31 and the coils 32c of the electromagnet 32 is energized, and thus, the magnetic generating means 30 starts. The electromagnet 31, which is the magnetic generating means 30, includes a magnetic operation unit 32a which has curvature about the rotation shaft 10a at the end of the core 31b and is formed in a concave arc shape. The electromagnet 32, which is another magnetic generating means 30, includes a magnetic operation unit 32a which has curvature about the rotation shaft 10a at the end of the core 32b and is formed in a concave arc shape. The rotating body 20 is the weight 25 having a shape in which the side surface of the column having the convex surface 20a is partially cut.

The state in which the motor 10 starts and the weight 25 is rotated includes a state in which the convex surface 20a of the weight 25 and the magnetic operation unit 31a approaches each other as shown in FIG. 7A, and a state in which the convex surface 20a of the weight 25 and the magnetic operation unit 32a approaches each other as shown in FIG. 7B. As shown in FIGS. 7A and 7B, the convex surface 20a of the rotating body 20 and the magnetic operation unit 31a approaches each other by a half-rotation period, and the convex surface 20a of the rotating body 20 and the magnetic operation unit 32a approaches each other by a half-rotation period. According to the approaching between the rotating body 20, and the magnetic operation unit 31a or the magnetic operation unit 32a, a magnetic attraction force can be effectively applied. When the generation of the vibration is required, by the magnetic field from the magnetic generating means 30, the magnetic attraction force is generated in the rotating body 20 formed of the soft magnetic material. If the coils 31c of the electromagnet 31 are energized, the magnitude of the magnetic attraction force applied to the rotating weight 25 is periodically changed, and thus, the vibration in an X1-X2 direction can be generated in the vibration generating device 2. If the coils 32c of the electromagnet 32 are energized, the magnitude of the magnetic attraction force applied to the rotating weight 25 is periodically changed, and thus, the vibration in an Y1-Y2 direction can be generated in the vibration generating device 2.

The magnetic generating means 30 disposed in the X2 direction applies the magnetic attraction force from the direction (X2 direction) orthogonal to the rotation shaft 10a, and thus, the vibration in the direction (X1-X2 direction) orthogonal to the rotation shaft 10a can be effectively generated. The vibrations generated at this time are vibrations in which the vibration generated in the motor 10 and the vibration generated in the magnetic generating means 30 are mixed, and thus, when the motor and the magnetic generating means are fixed to a case, the vibrations become minute vibrations in which each fixed location is a fixed end.

The amplitude of the vibration can be adjusted by controlling the current energized to coils 31c of the electromagnet 31, and can be adjusted even when the motor 10 and the magnetic generating means 30 are fixed state. The basic frequency of the vibration can be adjusted by the rotating speed of the rotating body 20.

The magnetic generating means 30 disposed in the Y1 direction applies the magnetic attraction force from the direction (Y1 direction) orthogonal to the rotation shaft 10a, and thus, the vibration in the direction (Y1-Y2 direction) orthogonal to the rotation shaft 10a can be effectively generated. The vibrations generated at this time are vibrations in which the vibration in the motor 10 and the vibration in the magnetic generating means 30 are mixed, and thus, when the motor and the magnetic generating means are fixed to a case, the vibrations become minute vibrations in which each fixed location is a fixed end.

When the coils 31c of the electromagnet 31 and the coils 32c of the electromagnet 32 are energized, in the state where the motor 10 starts and the weight 25 is rotated, the magnetic attraction force can be applied for each ¼ rotation.

When either the coils 31c of the electromagnet 31 or the coils 32c of the electromagnet 32 is energized, in the state where the motor 10 starts and the weight 25 is rotated, the magnetic attraction force can be applied for each ½ rotation.

The rotation control unit 40 includes the vibration direction changing means 45, and thus, it is possible to switch the energization between the coils 31c of the electromagnet 31 and the coils 32c of the electromagnet 32. In the state where the motor 10 starts and the weight 25 is rotated, the energization between the coils 31c of the electromagnet 31 and the coils 32c of the electromagnet 32 is switched, and thus, the direction of the vibration generation is switched to the X1-X2 direction or the Y1-Y2 direction orthogonal to the rotation shaft 10a. Moreover, it is not necessary to interlock the rotating speed of the rotating body 20 and the switching timing of the energization between the coils 31c and the coils 32c performed by the vibration direction changing means 45. For example, the vibration in the X1-X2 direction continues during a fixed period, and when other vibration modes are required, the vibration in the Y1 -Y2 direction can be generated.

Moreover, an energization control may be performed, which appropriately combines the state where the coils 31c of the electromagnet 31 and the coils 32c of the electromagnet 32 are energized, the state where either the coils 31c of the electromagnet 31 or the coils 32c of the electromagnet 32 is energized, and the state where the state where the coils 31c of the electromagnet 31 and the coils 32c of the electromagnet 32 are not energized. Accordingly, a greater variety of vibrations can be generated.

Hereinafter, effects according to the present embodiment will be described.

The vibration generating device 2 of the present embodiment includes the motor 10 having the rotation shaft 10a, the rotating body 20 which is rotated along with the rotation of the rotation shaft 10a and generates the vibration, and the rotation control unit 40 which controls the rotation of the motor 10. Moreover, the vibration generating device 2 of the present embodiment includes two magnetic generating means 30 which is disposed at a non-contact position with the rotating body 20. Moreover, the center of gravity of the rotating body 20 is positioned on the axis of the rotation shaft 10a, and the rotation body is formed of the soft magnetic material and has the outer shape which can generate the vibration by the magnetic attraction force which is applied to the soft magnetic material by the magnetic field from the magnetic generating means 30 when the rotating body is rotated.

According to this configuration, by the magnetic field generated by the magnetic generating means 30, the magnetic attraction force from the magnetic generating means 30 disposed at the non-contact position attracts the soft magnetic material, and thus, the vibration generating device 2 generating the vibration when the rotating body 20 formed of the soft magnetic material is rotated can be obtained. By controlling the strength of the magnetic field from two magnetic generating means 30 and the rotating speed of the motor 10, various vibration patterns can be easily obtained.

Moreover, in the vibration generating device 2 of the present embodiment, two magnetic generating means 30 are disposed in two directions orthogonal to the rotation shaft 10a at a gap with the rotating body 20. Moreover, preferably, the magnetic generating means 30 includes the vibration direction changing means 45 in which the direction of the vibration generation can be switched to the plurality of directions orthogonal to the rotation shaft 10a, and the vibration can be changed in a different direction by the vibration direction changing means 45.

According to this aspect, the magnetic generating means 30 applies the magnetic attraction force from the direction orthogonal to the rotation shaft 10a, and thus, the vibration in the direction orthogonal to the rotation shaft 10a can be effectively generated. Moreover, the magnetic generating means can be vibrated in two directions orthogonal to the rotation shaft 10a, and thus, a greater variety of vibration patterns can be obtained.

In the vibration generating device 2 of the present embodiment, preferably, the magnetic generating means 30 includes the magnetic operation unit 31a formed in the concave arc shape having the curvature about the rotation shaft 10a, the rotating body 20 includes the convex surface 20a having the curvature about the rotation shaft 10a, and when the rotating body 20 is rotated, the convex surface 20a approaches the magnetic operation unit 31a. According to this configuration, the rotating body 20 and the magnetic operation unit 31a of the magnetic generating means 30 approaches each other, and thus, the magnetic attraction force can be effectively applied.

In the vibration generating device 2 of the present embodiment, the magnetic generating means 30 is the electromagnet 31 and the electromagnet 32, and the magnetic attraction force can be changed by controlling the current energized with respect to the coils 31c of the electromagnet 31 and the coils 32c of the electromagnet 32. According to this aspect, the strength of the magnetic field can be changed by controlling the current energized with respect to the coils 31c of the electromagnet 31 and the coils 32c of the electromagnet 32, and thus, according to this, an attraction force of the rotating body 20 can be freely controlled, and various vibration patterns can be obtained.

In the vibration generating device 2 of the present embodiment, preferably, the coils 31c of the electromagnet 31 and the coils 32c of the electromagnet 32 are energized when the vibration is generated, and the rotation control unit 40 controls the rotation of the motor 10 to rotate the rotating body 20 prior to the vibration.

In the vibration generating device of the related art, the vibration is always generated when the eccentric weight is rotated, and thus, the rotation itself should stop when the vibration is not required. Accordingly, the motor 10 is initially rotated when the vibration is required, and thus, the timing at which the vibration is generated is delayed. On the other hand, in the vibration generating device 2 of the present embodiment, according to the configuration, the center of gravity of the rotating body 20 is positioned on the rotation shaft 10a, and thus, the vibration is not generated even when the rotating body is rotated in the state where the magnetic field is not applied, and the rotating body can always rotate. Accordingly, it is possible to instantaneously generate the vibration.

Figure 8:
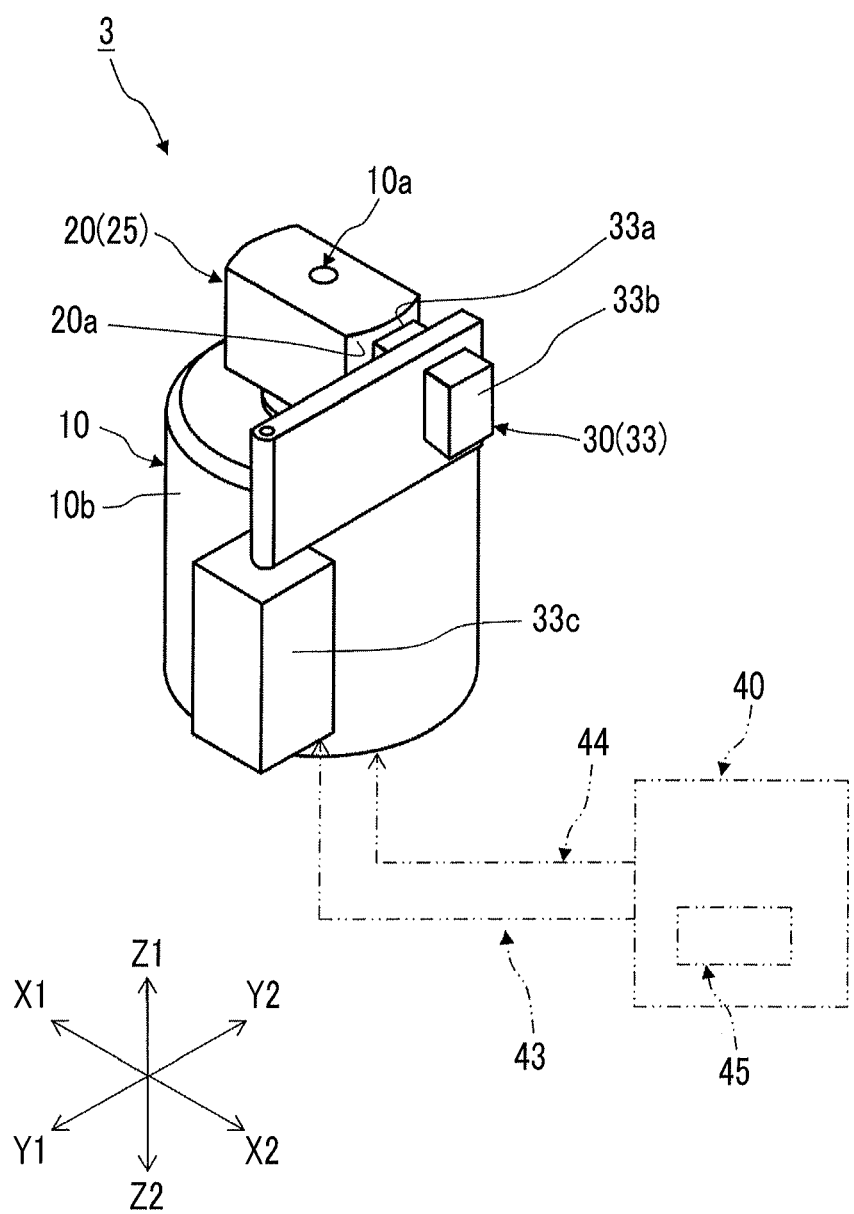
FIG. 8 is a perspective view showing a vibration generating device of a third embodiment of the present invention.
Figure 9A:
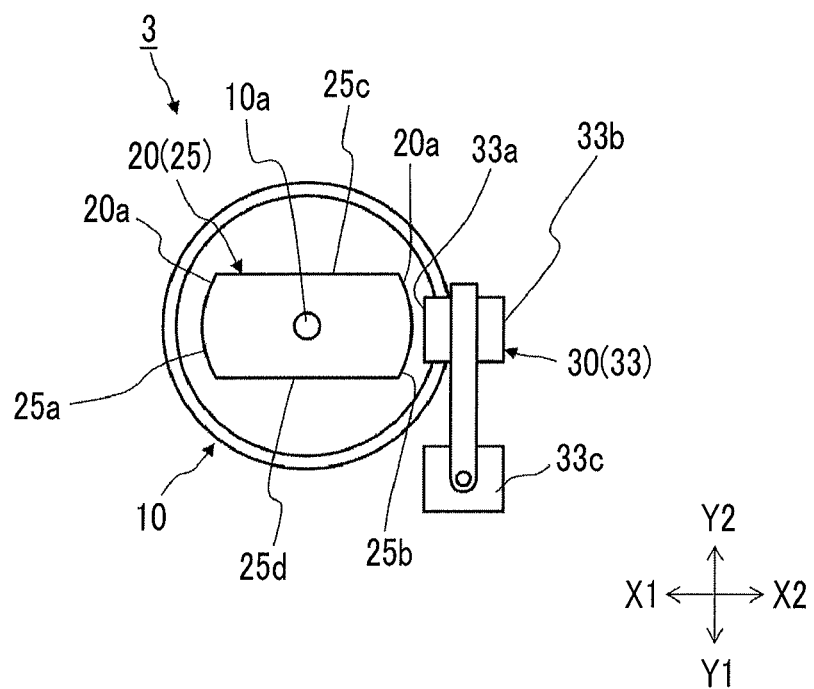
FIGS. 9A and 9B are outline views showing the vibration generating device of the third embodiment.
Figure 9B:
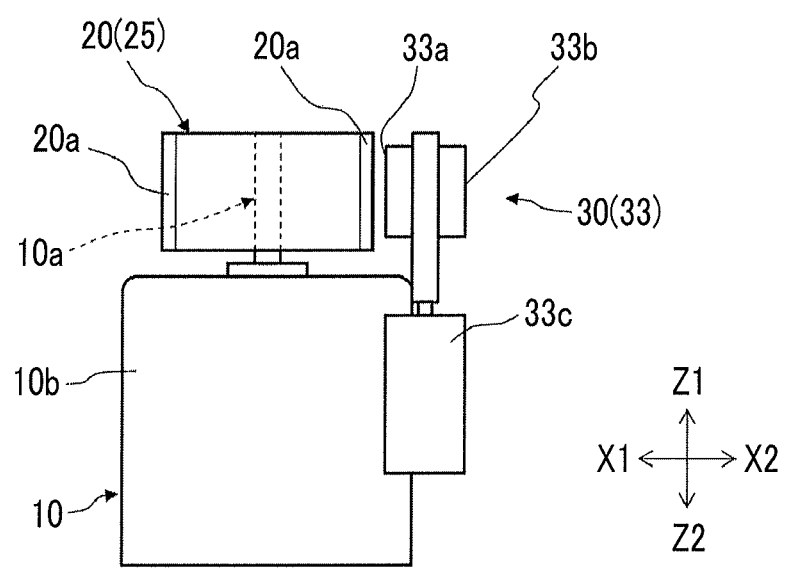
Figure 10A:
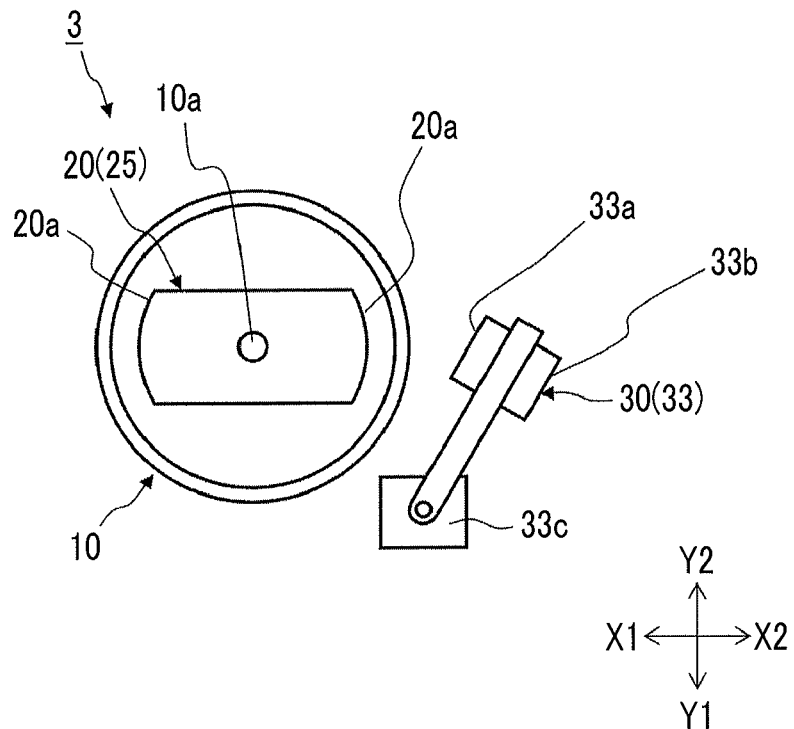
FIGS. 10A and 10B are schematic views showing an operation of the vibration generating device of the third embodiment.
Figure 10B:
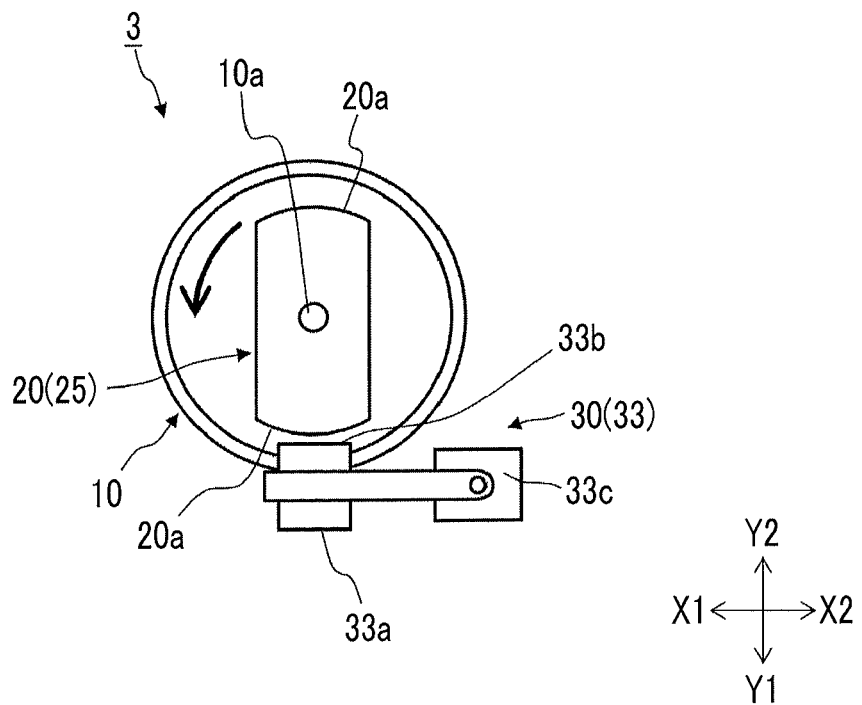
Figure 11A:
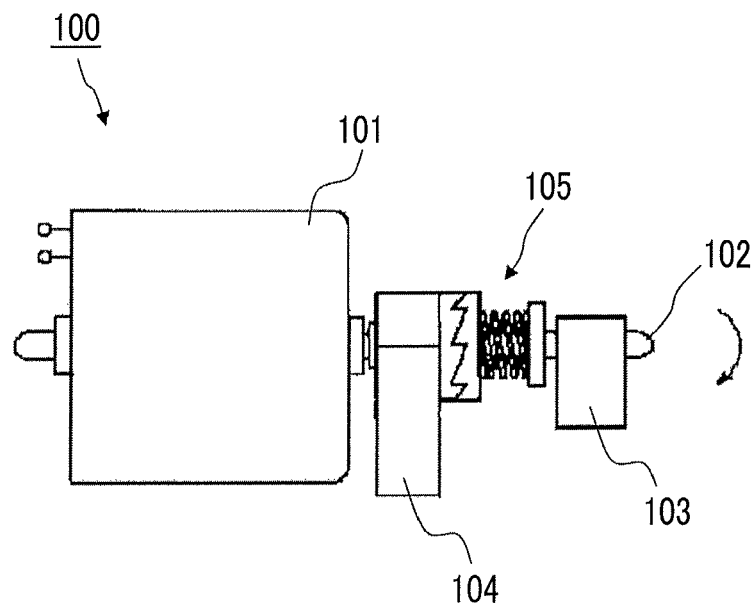
FIGS. 11A and 11B are side views showing a vibration generating device of the related art.
Figure 11B:
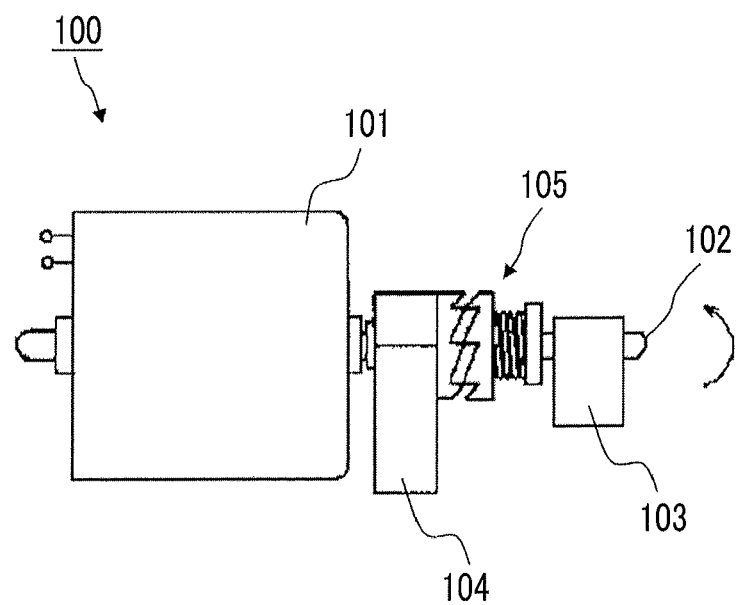

A vibration generating device 3 of a third embodiment of the present invention will be described. FIG. 8 is a perspective view showing the vibration generating device 3 of the third embodiment of the present invention. FIGS. 9A and 9B are outline views showing the vibration generating device 3 of the third embodiment, FIG. 9A is a plan view thereof, and FIG. 9B is a front view thereof. FIGS. 10A and 10B are schematic views showing an operation of the vibration generating device 3 of the third embodiment, FIG. 10A shows a state where the magnetic attraction force is decreased, and FIG. 10B shows a state where the device is vibrated in a second vibration direction.

As shown in FIGS. 8 to 9B, the vibration generating device 3 of the third embodiment includes the motor 10 having the rotation shaft 10a, the rotating body 20 attached to the rotation shaft 10a, the rotation control unit 40 which controls the rotation of the motor 10, and the magnetic generating means 30 which is disposed at a non-contact position with the rotating body 20. As a difference of the third embodiment with respect to the vibration generating device 1 of the first embodiment, in the third embodiment, the magnetic generating means 30 is configured of a permanent magnet 33. Moreover, other configurations are the same as the vibration generating device 1 of the first embodiment, and the same reference numerals are assigned to the same portions, and the descriptions thereof are omitted.

The magnetic generating means 30 disposed in the X2 direction of the rotating body 20 is the permanent magnet 33 having magnetic operation units 33a and 33b, and is orthogonal to the rotation shaft 10a at a gap with the rotating body 20. The permanent magnet 33 is attached to a movable portion 33c so that the magnetic operation units 33a and 33b are exposed, and the position of the permanent magnet is controlled by the rotation control unit 40 which is electrically connected to the movable portion 33c by the wiring 43. Moreover, the movable portion 33c of the present embodiment is a rotation mechanism, and as shown in FIG. 10A, the magnetic operation unit 33a can be away from the rotating body 20.

In the vibration generating device 3 of the present embodiment, the rotating body 20 is the weight 25 having the center of gravity disposed on the axis of the rotation shaft 10a and having the shape in which a portion of the side surface of the column including the convex surface 20a having the curvature about the rotation shaft 10a is cut. The weight 25 is formed of a hard magnetic material and is formed by partially cutting the side surfaces of the column, and thus, the weight can be simply formed and can be magnetized.

The rotation control unit 40 is an electric circuit, which controls the rotation of the motor 10. The rotation control unit 40 of the present embodiment controls the starting, the stopping, and the rotating speed of the motor 10, and controls the position of the permanent magnet 33 which is the magnetic generating means 30. In order to control the position of the permanent magnet 33, which is the magnetic generating means 30, the rotation control unit 40 includes the vibration direction changing means 45. Moreover, the rotation control unit 40 can be positioned at a position separated from the motor 10 or the magnetic generating means 30 via wirings 43 and 44. In addition, an electronic circuit of the electronic equipment attaching the vibration generating device 3 may configure the rotation control unit 40.

When the generation of the vibration is required, as shown in FIGS. 9A and 9B, the magnetic generating means 30 approaches the weight 25. The state where the motor 10 starts and the weight 25 is rotated includes a state where the convex surface 20a of the weight 25 opposes the magnetic operation unit 33a, and the convex surface 20a of the weight 25 does not oppose the magnetic operation unit 33a.

In the case where the convex surface 20a of the weight 25 and the magnetic operation unit 33a approach each other by a half-rotation period, when S poles or N poles oppose each other, a repulsive force is generated, and when the S pole and the N pole oppose each other, an attraction force is generated. The rotating body 20 and the magnetic operation unit 33a or the magnetic operation unit 33b approach each other, and thus, the magnetic repulsive force and the magnetic attraction force can be effectively applied. The magnitudes of the magnetic repulsive force and the magnetic attraction force applied to the rotating weight 25 are periodically changed, and thus, the vibration in the X1 -X2 direction can be generated in the vibration generating device 3.

When the stopping of the vibration in the vibration generating device 3 is required, the rotation of the motor 10 stops. Moreover, as shown in FIG. 10A, without stopping the rotation of the motor 10, the movable portion 33c is rotated by the vibration direction changing means 45, when the opposing distance between the convex surface 20a of the weight 25 and the magnetic operation unit 33a is increased, the magnetic force is decreased by square of the distance, and thus, the vibration can be decreased. If the vibration is sufficiently decreased, the state is substantially the same as the state where the vibration is stopped.

Moreover, the movable portion 33c is rotated by the vibration direction changing means 45, and as shown in FIG. 10B, the magnetic operation unit 33b opposes the convex surface 20a of the weight 25, and thus, the vibration direction may be switched in the Y1 direction.

In addition, if the rotating speed of the motor 10 is controlled, the frequency of the vibration can be changed.

Hereinafter, effects according to the present embodiment will be described.

The vibration generating device 3 of the present embodiment includes the motor 10 having the rotation shaft 10a, the rotating body 20 which is attached to the rotation shaft 10a, is rotated along with the rotation of the rotation shaft 10a, and generates the vibration, the rotation control unit 40 which controls the rotation of the motor 10, and the magnetic generating means 30 which is disposed at a non-contact position with the rotating body 20. Moreover, the center of gravity of the rotating body 20 is positioned on the axis of the rotation shaft 10a, and the rotation body is formed of at least a magnetic material and has the outer shape which can generate the vibration by the magnetic repulsive force and the magnetic attraction force which are applied to the magnetic material by the magnetic field from the magnetic generating means 30 when the rotating body is rotated.

According to this configuration, the vibration generating device 3 can be obtained, in which, according to the magnetic repulsive force and the magnetic attraction force between the magnetic generating means 30 and the magnetic material disposed in the non-contact manner to each other by the magnetic field generated by the magnetic generating means 30, the vibration is generated when the rotating body 20 formed of the magnetic material is rotated. By controlling the shape of the magnetic material and the rotating speed of the motor 10, various vibration patterns can be easily obtained.

In the vibration generating device 3 of the present embodiment, the magnetic generating means 30 is a permanent magnet 33 which is disposed to be movable, and thus, the magnetic attraction force is controlled to the magnitude generating the vibration, by moving the permanent magnet 33. In this configuration, the repulsive force and the attraction force of the rotating body 20 can be freely controlled according to controlling the positional relationship between the permanent magnet 33 and the rotating body 20, and thus, various vibration patterns can be obtained.

Moreover, in the vibration generating device 3 of the present embodiment, the magnetic generating means 30 is disposed in the direction orthogonal to the rotation shaft 10a at a gap with the rotating body 20. According to this configuration, the magnetic generating means 30 applies the magnetic attraction force from the direction orthogonal to the rotation shaft 10a, and thus, the vibration in the direction orthogonal to the rotation shaft 10a can be effectively generated.

Moreover, preferably, in the vibration generating device 3 of the present embodiment, the magnetic generating means 30 includes the vibration direction changing means 45 in which the direction of the vibration generation can be switched to the plurality of directions orthogonal to the rotation shaft 10a, and the vibration can be changed in a different direction by the vibration direction changing means 45. According to this configuration, the vibration generating device can be vibrated in the plurality of directions orthogonal to the rotation shaft 10a, and a greater variety of vibration patterns can be obtained.

Moreover, in the vibration generating device 3 of the present embodiment, preferably, the rotating body 20 is a magnetic material having the center of gravity positioned on the axis of the rotation shaft 10a and having a three-dimensional outer shape which can generate the vibration by the magnetic attraction force. According to this configuration, the rotating body 20 generating the vibration is the magnetic material having a three-dimensional outer shape which can generate the vibration by the magnetic attraction force which is applied to the magnetic material by the magnetic field from the magnetic generating means 30 when the rotating body is rotated, and thus, various vibration patterns can be further easily obtained.

In addition, in the vibration generating device 3 of the present embodiment, preferably, the rotating body 20 is the weight 25 having the center of gravity positioned on the axis of the rotation shaft 10a and having an approximately rectangular shape which is formed of two arcs 25a and 25b in which the projected shapes are point symmetrically when viewed in the axial direction of the rotation shaft 10a, and two straight lines 25c and 25d which connect ends of the arcs 25a and 25b. According to this configuration, the rotating body 20 generating the vibration is the weight 25 having the shape in which the side surface of the column is partially cut, and thus, the rotating body can be simply formed.

As described above, the vibration generating devices according to the embodiments of the present invention are specifically described. However, the vibration generating devices are not limited to the above-described embodiments, and may be modified within a scope which does not depart from the gist of the present invention. For example, the present invention may be modified as follows, and the modifications are also included in the technical scopes of the present invention.

(1) In the first to third embodiments of the present invention, the center of gravity of the rotating body 20 is positioned on the axis of the rotation shaft 10a. However, the rotating body 20 may be pivoted to the rotation shaft 10a so that the center of gravity is swung on the rotation shaft 10a by the magnetic attraction force. Practically, it is not preferably that the axial swinging is not generated when the magnetic attraction force is applied from the magnetic generating means 30. That is, if the axial swinging is somewhat generated, larger vibrations can be generated.

(2) In the first and second embodiment of the present invention, the rotating body 20 is formed of a soft magnetic material having the center of gravity positioned on the axis of the rotation shaft 10a, and is the weight 25 having the shape, in which the side surface of the column is partially cut, as the outer shape which can generate the vibration by the magnetic attraction force when the rotating body is rotated. The shape of the rotating body 20 is not limited to this shape. For example, the projected shape of the rotating body 20 when viewed in the axial direction of the rotation shaft 10a may be an elliptical shape or a rectangular shape. Moreover, the shape of the rotating body 20 may not be a uniform shape along the axial direction of the rotation shaft 10a, and may be a three-dimensional shape in which the magnetic attraction force is changed when the rotating body is rotated. Moreover, the shape of the rotating body 20 may have a shape in which the outer diameter shape is a column, a magnetic material and a non-magnetic material are bonded to each other, the center of gravity is positioned on the axis of the rotation shaft 10a, and the magnetic attraction force is changed when the rotating body is rotated.

(3) In the first and second embodiment of the present invention, the rotating body 20 is formed of a soft magnetic material having the center of gravity positioned on the axis of the rotation shaft 10*a*. However, the rotating body 20 may use a hard magnetic material and may be magnetized in advance. Moreover, in the third embodiment of the present invention, the permanent magnet 33 may be formed in a U shape, and the S pole and the N pole may simultaneously oppose the rotating body 20.

It should be understood by those skilled in the art that various modifications, combinations, sub-combinations and alterations may occur depending on design requirements and other factors insofar as they are within the scope of the appended claims of the equivalents thereof.

What is claimed is:

1. A vibration generating device comprising:
    a motor having a rotation shaft;
    a rotating body, which is attached to the rotation shaft, is rotated along with rotation of the rotation shaft, and generates a vibration;
    a rotation control unit configured to control rotation of the motor; and
    a magnetic generating unit that is disposed at a non-contact position with the rotating body; and wherein:
    the rotating body has the center of gravity positioned on an axis of the rotation shaft, has at least a magnetic material, and generates the vibration by a magnetic attraction force applied to the magnetic material by a magnetic field from the magnetic generating unit when the rotating body is rotated;
    the magnetic generating unit includes a magnetic operation unit having a concave arc shape having curvature about the rotation shaft,
    the rotating body includes a convex surface having the curvature about the rotation shaft, and the convex surface approaches the magnetic operation unit when the rotating body is rotated;
    the magnetic operation unit is disposed on the surface facing the convex surface; and
    the amplitude of the vibration can be adjusted by the rotation control unit for controlling the current energized with the magnetic generating unit, and the frequency of the vibration can be adjusted by the rotation control unit for controlling the rotating speed of the rotating body.

2. The vibration generating device according to claim 1, wherein the rotating body is a magnetic material having a three-dimensional outer shape which has the center of gravity positioned on the axis of the rotation shaft and can generate the vibration by the magnetic attraction force.

3. The vibration generating device according to claim 1, wherein the rotating body is a weight having the center of gravity positioned on the axis of the rotation shaft and having an approximately rectangular shape formed of two arcs in which the projected shapes are point symmetrically when viewed in the axial direction of the rotation shaft, and two straight lines connecting ends of the arcs.

4. The vibration generating device according to claim 1, wherein the magnetic generating unit is disposed in the direction orthogonal to the rotation shaft at a gap with the rotating body.

5. The vibration generating device according to claim 1, wherein the magnetic generating unit includes vibration direction changing unit for switching a direction of a vibration generation to a plurality of directions orthogonal to the rotation shaft, and
wherein the vibration can be changed in a different direction by the vibration direction changing unit.

6. The vibration generating device according to claim 1, wherein the magnetic generating unit comprises an electromagnet, and the magnetic attraction force can be changed by controlling current energized with respect to the electromagnet.

7. The vibration generating device according to claim 6, wherein the electromagnet is energized when the vibration is generated, and the rotation control unit controls the rotation of the motor to rotate the rotating body prior to the vibration.

8. The vibration generating device according to claim 1, wherein the magnetic generating unit comprises a permanent magnet disposed to be movable, and the magnetic attraction force is controlled to the magnitude generating the vibration by moving the permanent magnet.

9. The vibration generating device according to claim 1, wherein the rotating body can always (the magnetic field is not applied) rotate.

10. The vibration generating device according to claim 1, wherein the rotating body is pivoted about the rotation shaft so that the center of gravity is swung on the rotation shaft by the magnetic attraction force.

* * * * *